US012763512B2

(12) United States Patent
Dobler

(10) Patent No.: US 12,763,512 B2
(45) Date of Patent: Oct. 13, 2026

(54) PLUG ASSEMBLY AND CLAMPING PART OF A PLUG ASSEMBLY

(71) Applicant: Neutrik AG, Schaan (LI)

(72) Inventor: Oliver Dobler, Tschagguns (AT)

(73) Assignee: Neutrik AG, Schaan (LI)

( * ) Notice: Subject to any disclaimer, the term of this patent is extended or adjusted under 35 U.S.C. 154(b) by 322 days.

(21) Appl. No.: 18/522,427

(22) Filed: Nov. 29, 2023

(65) Prior Publication Data

US 2025/0125553 A1 Apr. 17, 2025

(30) Foreign Application Priority Data

Oct. 17, 2023 (EP) .................................... 23204206

(51) Int. Cl.

*H01R 13/516* (2006.01)
*H01R 13/59* (2006.01)
*H01R 24/64* (2011.01)

(52) U.S. Cl.

CPC ........... *H01R 13/516* (2013.01); *H01R 13/59* (2013.01); *H01R 24/64* (2013.01)

(58) Field of Classification Search

CPC ...... H01R 13/516; H01R 13/59; H01R 24/64; H01R 13/501; H01R 13/533; H01R 13/506; H01R 13/639; H01R 13/502

See application file for complete search history.

(56) References Cited

U.S. PATENT DOCUMENTS

| | | | | | |
|---|---|---|---|---|---|
| 3,492,629 | A * | 1/1970 | Hirsch | H01R 4/50 | 439/393 |
| 3,885,849 | A * | 5/1975 | Bailey | H01R 13/506 | 439/518 |
| 3,958,300 | A * | 5/1976 | Tanaka | F16L 5/00 | 439/459 |
| 4,736,999 | A * | 4/1988 | Marks | H01R 13/6456 | 439/314 |
| 5,045,000 | A * | 9/1991 | Trame | H01R 33/02 | 174/92 |
| 5,888,095 | A * | 3/1999 | Hussaini | H01R 9/0503 | 439/394 |

(Continued)

FOREIGN PATENT DOCUMENTS

| | | |
|---|---|---|
| CN | 201805068 U | 4/2011 |
| EP | 1317025 B1 | 6/2003 |

(Continued)

*Primary Examiner* — Truc T Nguyen
(74) *Attorney, Agent, or Firm* — Volpe Koenig

(57) ABSTRACT

A plug assembly having a clamping part, a clamping sleeve, and a housing. The clamping part receives and positions the cable plug at a front portion thereof and engages around a cable in a rear portion. There is a fixed connection between clamping part and sleeve, and the connection generates increasing radial compression on the rear portion of the clamping part to clamp the cable. The housing is pluggable into a complementary socket and receives and positions the clamping part in a latched position via a latching arrangement. The latching connection is releasable between the clamping part and housing by a tilting movement that results in a clamping part engagement element disengaging from a housing stop element. The housing can be pushed rearward along the cable, such that the cable plug and clamping part are no longer covered by the housing.

18 Claims, 10 Drawing Sheets

(56) References Cited

U.S. PATENT DOCUMENTS

| | | | | |
|---|---|---|---|---|
| 6,648,674 | B1 * | 11/2003 | Dobler | H01R 13/5841 439/459 |
| 7,303,418 | B2 * | 12/2007 | O'Connor | H01R 13/5208 439/369 |
| 7,699,645 | B1 * | 4/2010 | Montena | H01R 4/5025 439/462 |
| 7,988,476 | B2 * | 8/2011 | Billman | H01R 13/516 439/271 |
| 8,483,537 | B2 * | 7/2013 | Zeng | G02B 6/4472 385/137 |
| 8,969,742 | B2 * | 3/2015 | Bartholoma | H02G 3/0666 174/654 |
| 11,594,839 | B2 * | 2/2023 | Hofmann | H01R 13/639 |
| 2003/0148652 | A1 * | 8/2003 | Bernardi | G02B 6/3879 439/462 |
| 2004/0038588 | A1 * | 2/2004 | Bernardi | G02B 6/3879 439/587 |
| 2006/0166554 | A1 * | 7/2006 | Hung | H01R 13/5205 439/589 |
| 2008/0032556 | A1 * | 2/2008 | Schreier | H01R 13/65912 439/607.41 |
| 2009/0067916 | A1 * | 3/2009 | Busse | G01D 11/30 439/314 |
| 2010/0261367 | A1 * | 10/2010 | Billman | H01R 13/516 439/271 |
| 2011/0065309 | A1 * | 3/2011 | Lindkamp | H01R 13/59 439/449 |
| 2011/0070766 | A1 * | 3/2011 | Lindkamp | H01R 13/59 439/462 |
| 2011/0117770 | A1 * | 5/2011 | Lindkamp | H02G 15/007 439/470 |
| 2011/0189876 | A1 * | 8/2011 | Schneider | G02B 6/3888 439/271 |
| 2012/0149227 | A1 * | 6/2012 | Yoshida | H01R 13/5219 439/277 |
| 2014/0011384 | A1 * | 1/2014 | Xu | H01R 4/36 439/271 |
| 2014/0030903 | A1 * | 1/2014 | Magno | H02G 15/046 29/863 |
| 2015/0118899 | A1 * | 4/2015 | Hugel | H01R 9/0515 439/578 |
| 2015/0303617 | A1 * | 10/2015 | Smith | H01R 13/639 439/461 |
| 2021/0098932 | A1 * | 4/2021 | Zechmann | H01R 24/64 |
| 2023/0216221 | A1 * | 7/2023 | Purdy | H01R 9/0521 439/578 |
| 2024/0128697 | A1 * | 4/2024 | Dobler | H01R 13/516 |
| 2024/0380159 | A1 * | 11/2024 | Dobler | H01R 13/635 |

FOREIGN PATENT DOCUMENTS

| | | | |
|---|---|---|---|
| JP | 2016029654 | A | 3/2016 |
| JP | 2021520606 | A | 8/2021 |
| WO | 2011066339 | A1 | 6/2011 |
| WO | 2022096190 | A1 | 5/2022 |

* cited by examiner

PLUG ASSEMBLY AND CLAMPING PART OF A PLUG ASSEMBLY

CROSS-REFERENCE TO RELATED APPLICATIONS

This application claims priority to European Patent Application No. 23204206.9, filed Oct. 17, 2023, which is incorporated herein by reference as if fully set forth.

TECHNICAL FIELD

The present invention relates to a plug assembly and a clamping part for a plug assembly for use with cables with cable plugs, in particular for data cables such as RJ45 cables, light guides, power cables and the like.

BACKGROUND

A cable is commonly available with a cable plug attached to at least one of the ends. In some applications, the cable plug preassembled to the cable by the cable manufacturer is susceptible to damage and failure. For example, it is not well suited to repeated plugging and unplugging into and out of a chassis plug. In addition to the frequent disconnection and reconnection of the plug connections, e.g. in touring stage performances, the plug connections are often exposed to heavy mechanical loads during operation.

For example, the high time pressure and the desired flexibility when it comes to stage performances often means that the artists and the set-up staff treat the equipment ruthlessly. For example, it is quite common for the assembly personnel to support themselves on the housings of cable connectors that have already been plugged in or to pull on the connecting cables. In such environments, cable connectors are specially designed to be resistant to mechanical impact and environmental influences, both when plugged in and when unplugged. In addition, used plug assemblies are often locked to prevent accidental removal.

The so-called “RJ45” plug is an exemplary example of a preassembled cable plug attached to the cable. However, this eight-pole plug used in many cases is susceptible to damage and failure due to repeated plugging into and unplugging from a chassis plug socket. Contacts become easily bent or displaced by being wrongly inserted. The plastics latch (spring arm) can suffer fatigue and break off, and therefore the plug then no longer sits firmly in the socket. The cable itself is prone to malfunction by being repeatedly kinked at the point at which the cable enters the plug socket. Furthermore, the cable can also be torn out of the plug by longitudinal loading. The plug housing is formed from plastic and is easily deformed or broken if, for example, it is inadvertently stepped upon. Other preassembled cable plugs, e.g. for fiber optic cables, electronic data cable, power cables and many others, have similar disadvantages.

An arrangement according to EP 1 317 025 B1 has therefore been proposed as a protector for the sensitive cable plugs. Furthermore, a cable plug protector for preassembled RJ45 cable plugs is sold by Neutrik Group under the name NE8MC and consists of a housing, a stop disk, a clamping part, a clamping sleeve and a kink protector. A housing for receiving the actual cable plug has an external thread in order, together with a clamping socket or union nut or clamping nut having an internal thread, to form a threaded connection. A radially compressible clamping part which engages around the cable and, in the compressed state, clamps the cable in the housing is received in the interior of the housing and partially with the clamping sleeve. When the threaded connection is tightened, the clamping sleeve, the clamping part, the housing, the cable plug and the cable are braced together and the clamping sleeve, clamping part, cable plug and housing form a plug assembly which can be connected to a complementary element, such as a plug socket, by plugging them together.

Such specifically designed plug assemblies for receiving and positioning a preassembled cable plug provide increased mechanical robustness and shielding against environmental influences, as is desirable in many fields, e.g. such as event technology, military equipment, or outdoor applications in general. However, there may still be occasions, where direct access to the preassembled cable plug is required, e.g. in the event that devices need to be connected to a laptop that does not have a socket of a complementary plug assembly suitable of receiving the specially designed plug assembly, which holds the preassembled cable plug. However, often the specially designed plug assemblies are not foreseen for rapid and frequent detaching of the pre-installed cable plug from the plug assembly. In some instances, disassembly leads to loose components which can be lost, such that reassembly is not possible anymore. In addition, often the specially designed plug assemblies are foreseen to receive and position a specific type of preassembled cable plug only. This complicates preparation/installation of preassembled cables of different manufacturers, such that the different cables can be used in the same application, e.g. the same music or theater event.

SUMMARY

It is therefore an object of the present invention to provide an improved plug assembly for use with a preassembled cable plug, which overcomes deficiencies of the prior art.

A further object is to provide a plug assembly for use with a preassembled cable plug, which provides rapid and frequent detaching of the pre-installed cable plug from the plug assembly.

A further object is to provide more efficient installation of preassembled RJ45 cable plugs in the plug assembly.

These objects are achieved by the realization of one or more of the features disclosed herein. Features which further develop the invention in an alternative or advantageous manner are described below and in the claims.

The invention relates to a plug assembly for use with a cable with a cable plug, e.g. for a data cable, a light guide, or a power cable. The plug assembly comprises a clamping part configured to receive and position the cable plug in a predetermined position at a front portion of the clamping part. A rear portion of the clamping part opposite the front portion of the clamping part is configured to engage around the cable when the cable plug is received and positioned by the clamping part in the predetermined position.

The plug assembly further comprises a housing for being plugged into a socket of a complementary plug assembly by approaching the socket with a front end of the housing, wherein the housing is configured to receive and position the clamping part in a latched position.

By way of example, the housing is often configured in such a way that a mechanically lockable plug connection is provided between the plug assembly and the socket of the complementary plug assembly. The complementary plug assembly may be a device plug, which is often referred to as chassis connector or chassis plug. The clamping part is accommodated inside the housing and fixed to the housing against axial tension (along the cable), wherein a radially compressed rear part of the clamping part encompasses the cable and clamps the cable in the housing. This construction achieves a strain-relieving effect on a cable connected to the plug assembly.

The positioning of the clamping part in the latched position is provided by a latching arrangement for providing the latched position by a stop element, arranged on the inside of the housing, and an engagement element, arranged on the outside of the clamping part. In the latched position of the clamping part in the housing, the engagement element is arranged opposite the stop element and engages the stop element (by being on a side of the stop element further toward a rear end of the housing, the rear end of the housing being opposite the front end of the housing) such that movement of the clamping part along a longitudinal axis of the housing toward the front end of the housing causes the engagement element to abut against the stop element. This results in preventing of further movement of the clamping part toward the front end of the housing.

By way of example, the plug assembly further comprises a clamping sleeve, wherein the clamping part and the clamping sleeve are configured to provide a fixed connection between one another, for which at least part of the clamping sleeve is advanced over the rear portion of the clamping part towards the front portion of the clamping part resulting in increasing radial compression of the rear portion of the clamping part.

For example, the clamping part and the clamping sleeve are configured for providing a threaded connection between each other, wherein tightening of the threaded connection results in a compressed state of the rear portion of the clamping part, which then clamps the cable.

In particular, the rear portion of the clamping part comprises two, particularly four, radially compressible spaced-apart extensions, wherein an outer shape of the extensions forms at least part of the radially compressible rear portion of the clamping part. These (fingerlike) extensions are thus configured to nestle against the cable and to be pressed against the cable as a result of the advancing of the clamping sleeve over the clamping part toward the front portion of the clamping part. For example, on their inside part facing the cable, the extensions comprise tangentially running rips or webs in order to provide increased clamping and gripping of a cable sheath.

By way of example, the plug assembly further comprises a tail part, e.g. embodied as a so-called kink protector, which has a front portion configured to be connected to the rear portion of the housing. In particular, the clamping sleeve and the tail part are separate components.

According to one aspect of the invention, the housing comprises on its inner side opposite the stop element a clamping part support area and is configured such that the engagement element can be brought out of engagement with the stop element with a tilting movement of the clamping part about a tilting axis through contact points of the clamping part with the clamping part support area, wherein the tilting axis is transverse to the longitudinal axis and the tilting movement causes the engagement element to disengage from the stop element.

By way of example, the housing and the clamping part are matched to one another that, in the latched position of the clamping part in the housing when the cable plug is received and positioned in the predetermined position at the front portion of the clamping part:

- the clamping part support area rests against the clamping part and is arranged further toward a rear end of the housing than the stop element (the rear end of the housing being opposite the front end of the housing);
- in a front portion of the housing from the clamping part support area toward the front end of the housing there is freedom of movement of the clamping part against the housing on side of the clamping part support area; and
- in a rear portion of the housing from the clamping part support area toward the rear end of the housing there is freedom of movement of the clamping part against the housing on side of the stop element.

In a further embodiment, the latching arrangement is further provided by a spring element of the clamping part which is supported in the latched position on a spring element contact area on an inside of the housing opposite the stop element. The spring element is configured for exerting a biasing force against the spring element contact area and thereby pushes the clamping part against a side of the housing on which the stop element is arranged (i.e. to maintain the latched position of the clamping part within the housing).

In particular, in the latched position the spring element contact area coincides with at least part of the clamping part support area such that the tilting axis runs through contact points of the spring element with the spring element contact area.

By way of example, the stop element is embodied as a transverse step on the inside of the housing configured to prevent movement of the clamping part toward the front end of the housing, the engagement element is embodied as a transverse ridge or edge on the outside of the clamping part, which is configured in a complementary manner to the transverse step, and the biasing force provided by the spring element acts to prevent the transverse ridge or edge from overstepping the transverse step.

This latching arrangement permits the clamping part (together with the cable plug) to be pushed forwards out of the housing, i.e. in the plugging-in direction. Normally, said pushing out of the clamping part or, in other words, said pulling-out of the housing from the clamping part to the rear, onto the portion of the cable actually lying behind a so-called kink protector, is prevented by a latching connection and can be brought about only by release thereof.

To release the plug assembly, the housing can be grasped and pulled off from the complementary plug assembly, wherein the force necessary for pulling off the cable plug is transmitted via the latching connection between step and transverse ridge from the housing to the clamping part (and the cable plug).

In order to release the latching connection between the clamping part and the housing, the clamping part (or cable plug) is pressed downwards counter to the force of the spring element, as a result of which the clamping part tilts about the tilting axis and the engagement element of the clamping part is disengaged from the stop element of the housing. The two parts can now be displaced relative to one another in the direction of the longitudinal axis. The housing (and, for example, a kink protector) can then be pushed rearward along the cable, as a result of which the cable plug and the clamping part are no longer covered by the housing. In this state, the cable plug can then be used for producing plug-in connections which would not be possible with the housing, i.e. with other plug assemblies which, although designed to match the actual cable plug, are not shaped in a complementary way with respect to the housing.

In a further embodiment, the clamping part is configured to receive and position a RJ45 cable plug as the cable plug.

RJ45 cable plugs typically comprise a latching element configured to latch the RJ45 cable plug to a conventional RJ45 socket. The spring element is arranged such that it provides a support for the latching element of the RJ45 cable plug to position the RJ45 cable plug in the predetermined position at the front portion of the clamping part.

By way of example, the spring element is embodied as a spring arm configured similarly to a spring arm of a preassembled RJ45 cable plug. In particular, the spring arm lies with a rounded outer contour in a correspondingly shaped depression on the inside of the housing and thus additionally contributes to the locking between housing and clamping part.

In a further embodiment, the clamping part has a bottom side, a top side, and two lateral sides, wherein the bottom side comprises the engagement element, the top side is opposite the bottom side (and comprises the contact points of the clamping part with the clamping part support area in the latched position), the two lateral sides are opposite each other, and each of the two lateral sides connects the top side with the bottom side. In an area of the front portion of the clamping part each of the lateral sides has a flat outer surface and the outer surfaces of the two lateral sides are parallel to one another. Matched to this, the housing comprises on its inner side two flat surfaces opposite each other, wherein—in the latched position—each of the two flat surfaces of the housing is arranged opposite a respective one of the two flat outer surfaces of the clamping part. Therefore, contact between the flat surfaces of the housing with the flat outer surfaces of the clamping part prevents the clamping part from twisting about the longitudinal axis relative to the housing.

By way of example, the flat outer surfaces of the clamping part provide the additional benefit of allowing a compact enclosure of the cable plug such that in a separated state, wherein the clamping plug is separated from the housing (wherein the housing is pushed rearward along the cable, see above), a compact arrangement of plugged “bare” cable plugs next to each other is provided, e.g. if the cable plugs are used for producing plug-in connections in a plug assembly that is designed to match the actual cable plug but is not shaped in a complementary way with respect to the housing. For example, in case the clamping part is configured to receive a RJ45 cable plug, several individual plugs received by respective clamping parts can still be plugged next to each other into a “conventional” switch component that has multiple “conventional” (not shaped in a complementary way with respect to the housing) RJ45 sockets arranged next to each other in a tight grid.

In a further embodiment, the engagement element is arranged at the front portion of the clamping part, e.g. closer to a front end of the front portion of the clamping part than a rear end of the front portion of the clamping part.

In a further embodiment, the contact points of the clamping part lying on the tilting axis in the latched position are arranged at the front portion of the clamping part.

By way of example, such an arrangement allows efficient release of the engagement element from the stop element even with little freedom of movement of the rear end of the clamping part to provide the tilting movement of the clamping part.

In order to provide freedom of movement for the tilting movement of the clamping part, the housing is embodied, for example, such that a cylinder-like front section of the housing is offset parallel to a cylinder-like rear section of the housing. In other words, from the clamping part support area to the rear end of the housing an inner contour of the housing is formed essentially like a circular cylinder and from the stop element to the front end of the housing an inner contour is formed essentially like a further circular cylinder, wherein central longitudinal axes of the respective cylinders are offset parallel to each other.

In a further embodiment, a maximum radial diameter of the housing in a section from the clamping part support area to the rear end of the housing is smaller than a maximum radial diameter of the housing in a section from the stop element to the front end of the housing.

In a further embodiment, on the side of the stop element, the section from the clamping part support area to the rear end of the housing transitions essentially steplessly into the section from the stop element to the front end of the housing. On the side opposite the stop element, a diameter of the housing increases toward the front end of the housing in a transition area between the section from the clamping part support area to the rear end of the housing and the section from the stop element to the front end of the housing.

In a further embodiment, the housing comprises on its inside an edge with an edge face facing to the rear end of the housing, wherein the edge is arranged in the front portion of the housing, e.g. closer to a front end of the front portion of the housing than a rear end of the front portion of the housing, and the edge face is an end of a groove arranged on the inside of the housing, which runs without interruption from the rear end of the housing to the edge face.

By way of example, the edge provides a part of a mechanical locking mechanism for preventing removal of the plug assembly plugged into the socket of the complementary plug assembly from the socket of the complementary plug assembly, in that a releasable counterpart of the complementary plug assembly engages from the inside of the housing into the edge face of the housing.

In a further embodiment, the rear portion of the clamping part comprises a radially compressible tapered section having an outer shape that tapers towards a rear end of the clamping part. The tapered section comprises a tapered external thread area with an external thread that extends over the tapered external thread area. An inner contacting section of the clamping sleeve comprises a tapered internal thread area with an internal thread that extends over the tapered internal thread area, wherein the internal thread area has a tapered shape that matches a tapered shape of the external thread area. The external thread and the internal thread are configured to engage with each other to provide the fixed connection as a threaded connection, such that tightening of the threaded connection results in the inner contacting section of the clamping sleeve being advanced over the tapered section of the clamping part toward the front portion of the clamping part while being in contact with the tapered section, resulting in increasing radial compression of the rear portion of the clamping part.

The aspect of such specific type of threaded connection is described below again in isolation, and it goes without saying that the further embodiments of this aspect with regard to the isolated consideration below are compatible with the aspects and embodiments described above.

When having a tail part separate from the clamping sleeve, the clamping sleeve is also often called clamping nut. For example, the front portion of the tail part comprises an elastic coupling portion configured to engage (e.g. surround or reach under) at least part of the rear portion of the housing in a form-fitting and/or force-fitting manner.

By way of example, the tail part comprises an elastic rear portion opposite the front portion of the tail part, wherein the elastic rear portion is configured to surround the cable (when the cable plug is received and positioned in the clamping part and the clamping part is received and positioned in the latched position in the housing) and has an inside diameter that is smaller than an outside diameter of the cable. Such a tail part is often referred to as kink protector, because the kink protector is attached to the rear (towards the cable, away from the insertion opening) of the housing and stabilizes the cable so that the risk of the cable kinking is minimized. For example, the kink protector is configured as a reinforcement made of a rigid rubber or plastic material enclosing the cable.

In a further embodiment, the tail part is a multi-component injection molded part comprising elastic and hard material, wherein the clamping sleeve is formed by the hard material.

In a further embodiment, the clamping part is divided in the longitudinal direction into two half shells which are linked pivotably at the front end. For example, at the rear end the two half shells have the external thread (as described above and below with regard to the embodiment relating to having a threaded connection) for engaging with the internal thread of the clamping sleeve.

In a further embodiment, the clamping part is configured to receive and position a RJ45 cable plug in the predetermined position at the front portion of the clamping part.

The aspect of having two half shells, wherein the clamping part is configured to receive and position a RJ45 cable plug is described below again in isolation for a specific implementation that allows receiving two different types of RJ45 cable plugs, namely a RJ45 cable plug of a stepped type and a RJ45 cable plug of a stepless type. It goes without saying that the implementations of such two half shells as described below are compatible with the aspects and embodiments described above.

The invention further relates to a plug assembly for use with a cable with a cable plug, e.g. for a data cable, a light guide, or a power cable. The plug assembly comprises a clamping part which is configured to receive and position the cable plug in a predetermined position at a front portion of the clamping part, wherein a rear portion of the clamping part, which is opposite the front portion of the clamping part, is configured to engage around the cable when the cable plug is received and positioned by the clamping part in the predetermined position. The rear portion has a radially compressible tapered section having an outer shape that tapers towards a rear distal end of the clamping part. The plug assembly further comprises a clamping sleeve configured to approach the clamping part with a front end of the clamping sleeve and to be connected to the rear portion of the clamping part by means of a threaded connection. The clamping part and the clamping sleeve are configured that tightening of the threaded connection results in an inner contacting section of the clamping sleeve being advanced over the tapered section of the clamping part towards the front portion of the clamping part while being in contact with the tapered section, resulting in increasing radial compression of the rear portion of the clamping part. In other words, tightening of the threaded connection results in a compressed state of the tapered section of the clamping part, wherein the tapered section clamps the cable.

The clamping part is configured to be received by a housing of the plug assembly, wherein the housing is configured for being plugged into a socket of a complementary plug assembly by approaching the socket with a front end of the housing. The housing is configured to receive and position the clamping part in a front portion of the housing such that—when the cable plug is received and positioned in the clamping part and the clamping part is received and positioned in the housing—at least a front portion of the cable plug extending toward the front end of the housing is surrounded by the front portion of the housing at a distance.

According to this aspect of the invention, the tapered section of the clamping part comprises a tapered external thread area with an external thread that extends over the tapered external thread area. The inner contacting section of the clamping sleeve comprises a tapered internal thread area with an internal thread that extends over the tapered internal thread area, wherein the internal thread area has a tapered shape that matches a tapered shape of the external thread area of the clamping part and the external thread and the internal thread are configured to engage with each other to provide the threaded connection.

By way of example, matching means that that the tapered shapes of the inner and external thread areas are designed in such a way that when the clamping sleeve is brought up to the rear part of the clamping part to make the threaded connection, their surfaces essentially nestle against one another, i.e. an inner radius of the internal thread area increases towards the front end of the clamping sleeve.

For example, having the threads on matching tapered areas provides the benefit that independent of a thickness of the cable to be clamped by the clamping part, the clamping sleeve can be pushed without resistance over the tapered section of the clamping part in the direction of the front end of the clamping part until the threads engage, wherein a tightening of the threaded connection essentially directly results in a radial compression force acting on the rear part of the clamping part (and the cable). This prevents unnecessary screwing and the assembly of the clamping sleeve and the clamping part for clamping the cable becomes more efficient.

By way of example, each of the external and the internal thread comprises maximally ten turns, e.g. maximally eight turns.

In a further embodiment, the plug assembly comprises a tail part as described above, e.g. embodied as so-called kink protector, wherein the clamping sleeve and the tail part are separate components or the clamping sleeve is an integral part of the tail part, e.g. wherein the housing comprises a stop for the clamping part, configured to prevent movement of the clamping part toward a rear end of the housing.

The invention further relates to a clamping part for a plug assembly, wherein the clamping part is divided in the longitudinal direction into two half-shells, which are configured to clamp a RJ45 cable plug between them and thereby position the RJ45 cable plug in a predetermined position at a front portion of the clamping part. A radially compressible rear portion of the clamping part, which is opposite the front portion of the clamping part, is configured to engage around a cable connected to the RJ45 cable plug when the RJ45 cable plug is positioned by the two half shells in the predetermined position.

By way of example, the radially compressible rear portion of the clamping part is configured to interact with a clamping sleeve to be connected to the rear portion of the clamping part to provide adaption of a radial compression of the rear portion of the clamping part, e.g. wherein axial movement between the clamping sleeve and the radially compressible rear portion of the clamping part results in an adaption of a radial compressive force exerted by the clamping sleeve on the radially compressible rear portion of the clamping part.

In particular, the rear portion of the clamping part is embodied according to one of the embodiments described above, e.g. has radially compressible spaced-apart extensions and/or a tapered section with an external thread. For example, the radially compressible rear portion of the clamping part has a radially compressible tapered section having an outer shape that tapers towards a rear distal end of the clamping part, wherein the tapered section comprises a tapered external thread area with an external thread that extends over the tapered external thread area.

One of the two half-shells is configured for nesting against a top side, a backside, and two lateral sides of the RJ45 cable plug, and the other of the two half-shells is configured for nesting against a bottom side, the backside, and the two lateral sites of the RJ45 cable plug. The top side of the RJ45 cable plug is the side that comprises a latch element configured to latch the RJ45 cable plug to a conventional RJ45 socket, the bottom side is opposite the top side, the backside connects the top side with the bottom site on the cable side, and each of the lateral sides is adjacent the backside and connects the top side with the bottom side.

For example, two half shells are linked pivotably at the front end.

According to this aspect of the invention, the clamping part is configured to clamp and position a RJ45 cable plug of a stepped type and a RJ45 cable plug of a stepless type. This means that the same clamping part can be used interchangeably for different types of RJ45 cable plugs.

The RJ45 cable plug of the stepped type comprises a housing with a stepped surface on the bottom side, so that a rear part of the housing adjacent to the cable has a larger diameter in a direction perpendicular to the bottom side than a front part of the housing, which has contacts for providing signal transmission to the complementary plug assembly.

The RJ45 cable plug of the stepless type comprises a housing that is stepless on the bottom side, wherein the housing has at each of the lateral sides an extension (in direction towards the cable), which continues a respective side surface of the housing and extends beyond a housing surface on the backside.

In order to provide interchangeable use, the two half-shells each comprise an alignment structure to position the RJ45 cable plug in the predetermined position, wherein each alignment structure comprises two pockets arranged in a rear area of the respective alignment structure. Each of the two pockets is configured to receive one of the extensions of the RJ45 cable plug of the stepless type such that each of the two pockets of one of the two half-shells provides a boundary for the top side and the two lateral sides of the RJ45 cable plug of the stepless type and each of the two pockets of the other of the two half-shells provides a boundary for the bottom side and the two lateral sides of the RJ45 cable plug of the stepless type. In addition, a boundary structure is arranged in an area in front of the two pockets, wherein one of the boundary structures (a boundary structure of one of the two half-shells) provides a boundary for the two lateral sides and the top side of the RJ45 cable plug of the stepped type and the other of the boundary structures (the boundary structure of the other of the two half-shells) provides a boundary for the two lateral sides and the bottom side of the RJ45 cable plug of the stepped type, respectively. The boundary (i.e. a contact surface that provides the boundary) for the bottom side of the RJ45 cable plug of the stepped type (the boundary structure of the one of the two half-shells which is configured to nest against the bottom side of the RJ45 cable plug) is arranged offset from the boundaries for the bottom side of the RJ45 cable plug of the stepless type provided by the two pockets (i.e. provided by boundary surfaces of the pockets) in a direction perpendicular to the bottom side.

In one embodiment, the alignment structures to position the RJ45 cable plug in the predetermined position are configured that for each of the two half-shells front ends of each of the two pockets (i.e. surfaces of the pockets, which delimit a front end of a respective pocket opening towards the front) provide a boundary for the backside of the RJ45 cable plug of the stepped type. In particular, the alignment structures are configured that the front ends of the pockets are brought into contact with the backside of the RJ45 cable plug of the stepped type to position the RJ45 cable plug of the stepped type in the predetermined position.

In a further embodiment, the alignment structure for the one of the two half-shells that is configured for nesting against the top side of the RJ45 cable plug comprises a spring element arranged such that it provides a support for the latch element of the RJ45 cable plug to position the RJ45 cable plug in the predetermined position.

In a further embodiment, the alignment structures to position the RJ45 cable plug in the predetermined position each comprise lateral guide surfaces foreseen to be arranged opposite the lateral sides of the RJ45 cable plug to position the RJ45 cable plug in the predetermined position, wherein the lateral guide surfaces provide a stop for movement of the RJ45 cable plug in a front area of the alignment structure in a direction perpendicular to the lateral sides of the RJ45 cable plug.

In a further embodiment, each of the pockets of the alignment structure has an axial depth so that the pocket provides a backside boundary of the RJ45 cable plug of the stepless type such that the extensions of the RJ45 cable plug of the stepless type are brought into contact with the backside boundaries to position the RJ45 cable plug of the stepless type in the predetermined position.

In a further embodiment, the alignment structures are configured that the boundary for the bottom side of the RJ45 cable plug of the stepped type is brought into contact with the bottom side of the RJ45 cable plug of the stepped type to position the RJ45 cable plug of the stepped type in the predetermined position.

In a further embodiment, the alignment structures are configured that the boundaries provided by the pockets for the bottom side of the RJ45 cable plug of the stepless type are brought into contact with the bottom sides of the extensions of the RJ45 cable plug of the stepless type to position the RJ45 cable plug of the stepless type in the predetermined position.

In a further embodiment, the alignment structures are configured that to position the RJ45 cable plug in the predetermined position, the spring element provides a biasing force against the latch element of the RJ45 cable plug. The biasing force is configured that it results in the boundary for the bottom side of the RJ45 cable plug of the stepped type being brought into contact with the bottom side of the RJ45 cable plug of the stepped type, and the boundaries provided by the pockets for the bottom side of the RJ45 cable plug of the stepless type being brought into contact with the bottom sides of the extensions of the RJ45 cable plug of the stepless type, respectively.

The invention further relates to a plug assembly for use with a cable with a RJ45 cable plug, comprising a clamping part according to one of the embodiments described above, which is configured to receive the RJ45 cable plug and to position the RJ45 cable plug in a predetermined position within the clamping part, a clamping sleeve configured to be connected to the clamping part and to interact with the clamping part to provide adaption of a radial compression of a rear portion of the clamping part, and a housing for being plugged into a socket of a complementary plug assembly by approaching the socket with a front end of the housing, wherein the housing is configured to receive the clamping part and to position the clamping part in a front portion of the housing such that—when the RJ45 cable plug is positioned by the clamping part and the clamping part is positioned in the housing—at least a front portion of the RJ45 cable plug extending in the direction of the front end of the housing is surrounded by the front portion of the housing at a distance.

In particular, in any of the described plug assemblies described above, the housing may comprise part of a mechanical locking mechanism for preventing removal of the plug assembly plugged into the socket of the complementary plug assembly from the socket of the complementary plug assembly, e.g. a snap-action catch counterpart or a spring catch counterpart.

For example, the part of the mechanical locking mechanism is provided by an edge with an edge face facing to a rear end of the housing, which is opposite the front end of the housing, e.g. wherein the edge face is provided by a recess on or through the housing, or wherein the edge face is provided by a groove arranged on (the inside or outside of) the housing, which runs without interruption from the rear end of the housing to the edge face.

BRIEF DESCRIPTION OF THE DRAWINGS

The clamping part and the plug assemblies according to the different aspects of the invention are described or explained in more detail below, purely by way of example, with reference to working examples shown schematically in the drawing. Identical elements are labelled with the same reference numerals in the figures. Specifically.

DETAILED DESCRIPTION

Figure 1:
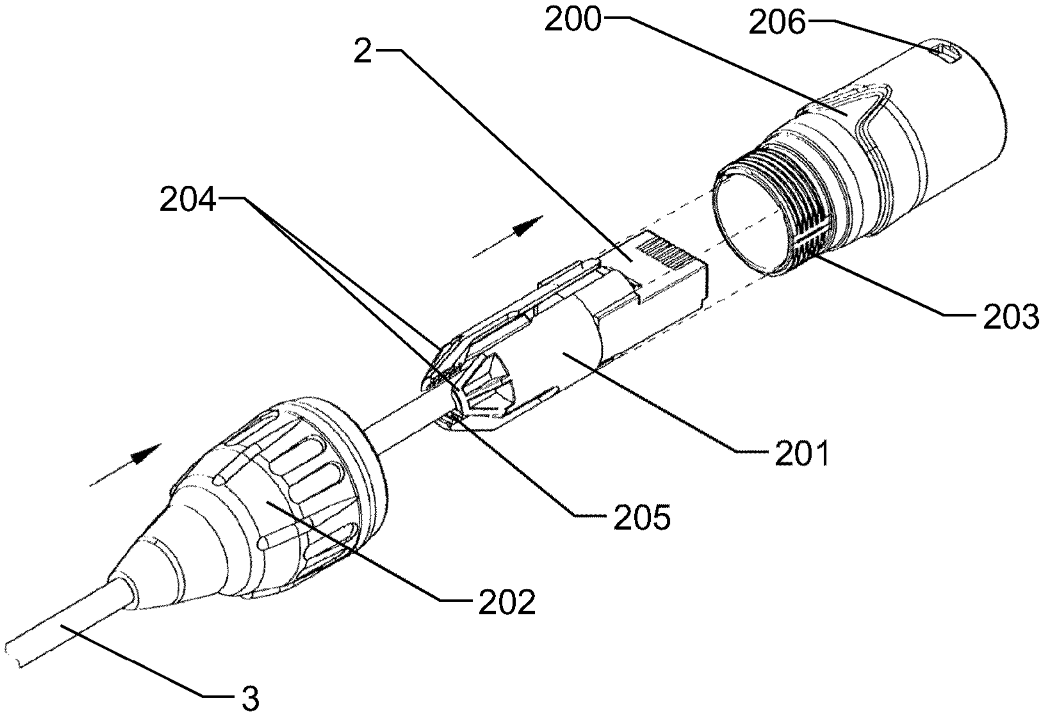
FIG. 1: a plug assembly of the prior art.

FIG. 1 shows a plug assembly of the prior art being used as a protector for a preassembled RJ45 cable plug 2. The plug assembly comprises a housing 200, a clamping part 201, and a kink protector 202, wherein a clamping sleeve is embodied as integral part of the kink protector 202. The housing 200 has an external thread 203 for engaging an internal thread (not visible) of the kink protector 202, such that the housing 200 and the kink protector 202 can form a threaded connection. The radially compressible clamping part 201 engages around the cable 2 and, in the compressed state, clamps the cable 2. The clamping part 201 is received in the interior of the housing 200 and partially within the clamping sleeve provided by the kink protector 202. When the threaded connection between the housing 200 and the kink protector 202 is tightened, the clamping sleeve, the clamping part 201, the housing 200, the cable plug 2 and the cable 3 are braced together. An inner contacting section of the clamping sleeve is advanced over a tapered section of the clamping part 201 towards the front portion of the clamping part 201 while being in contact with the tapered section, resulting in increasing radial compression of the tapered section. The radially compressible tapered section is embodied by fingerlike spaced-apart extensions 204, which comprise tangentially running rips 205 in order to provide increased clamping and gripping of a cable sheath. In the assembled state, the plug assembly can be connected to a complementary element, such as a plug socket. The housing 200 further comprises a snap-action catch counterpart 206 embodied by a hole piercing the outer shell of the housing in a front portion of the housing 200. The snap-action catch counterpart 206 provides a part of a mechanical locking mechanism for preventing removal of the plug assembly plugged into the socket of a complementary plug assembly from the socket of the complementary plug assembly, in that a releasable counterpart of the complementary plug assembly engages into the snap-action catch counterpart 206.

For getting direct access to the preassembled RJ45 cable plug 2, e.g. in case the cable plug 2 is to be used with a laptop or device, which is designed to match the cable RJ45 cable plug 2 but is not shaped in a complementary way with respect to the housing 200, the threaded connection between housing 200 and kink protector 202 has to be released and the housing 200 is pulled forwards away from the kink protector 202 and the clamping part 201.

Figure 2:
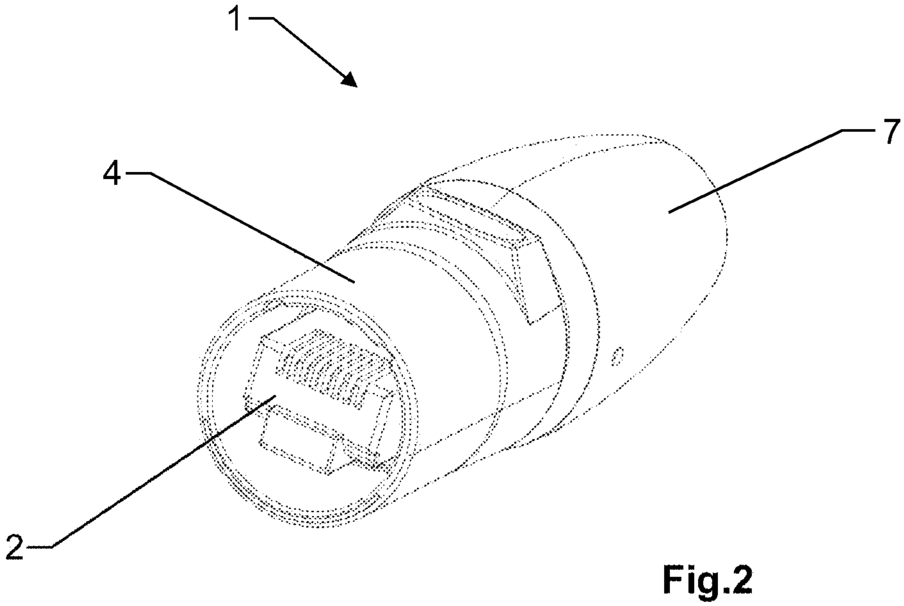
FIG. 2: an outer view of an assembled exemplary embodiment of a plug assembly according to the invention.
Figure 13:
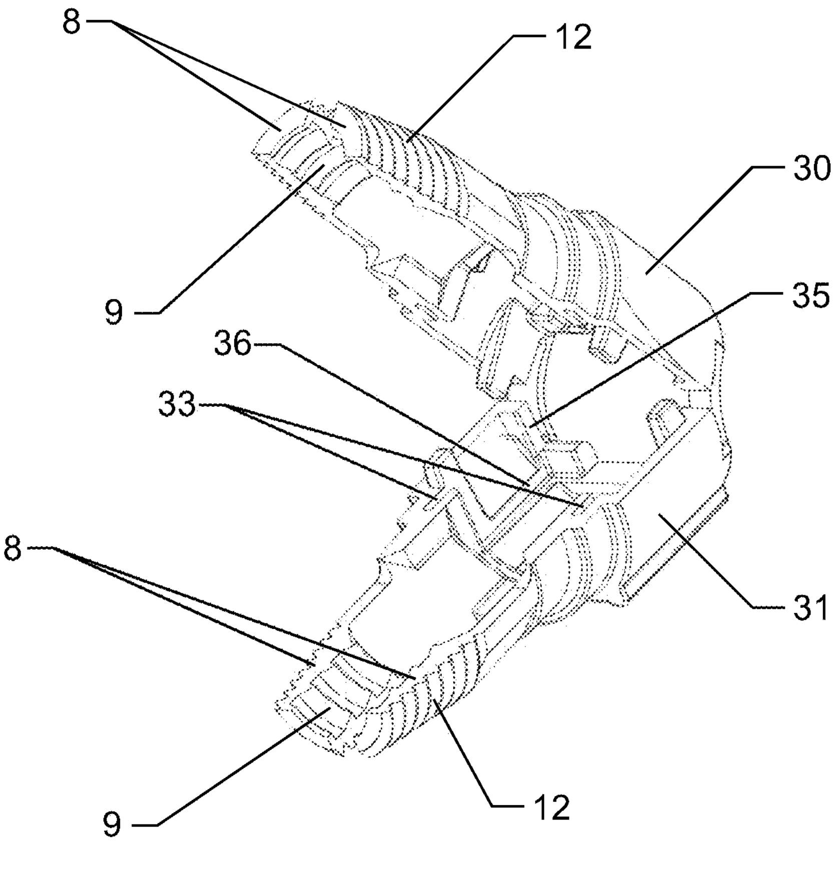
FIG. 13: a perspective view from the rear onto the clamping part depicted by FIG. 12.
Figure 14:
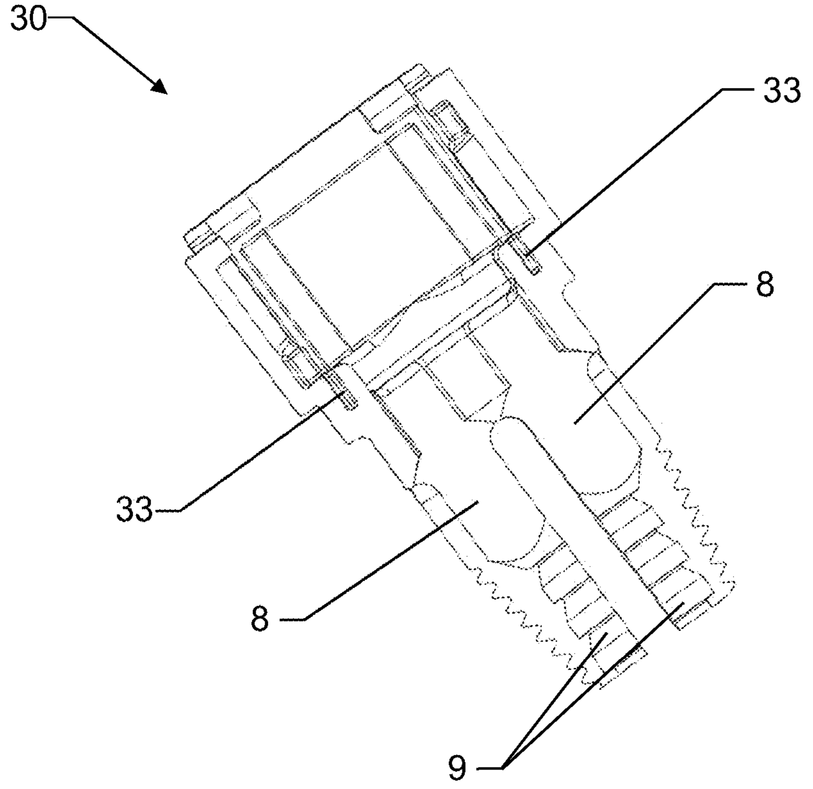
FIG. 14: a top view onto the one of the two half-shells depicted by FIG. 12, which is foreseen for nesting against the top side of the RJ45 cable plug.

In the following, the inventive aspects are exemplified by an embodiment of an inventive plug assembly 1 for use with a RJ45 cable plug 2. The plug assembly 1 comprises a housing 4, a clamping part 5, a clamping sleeve 6, and a kink protector 7 (e.g. see FIG. 4). The RJ45 cable plug 2 is received and positioned by the clamping part 5, wherein the clamping part 5 is received and positioned in the front of the housing 4 such that at least a front portion of the cable plug 2 extending in the direction of the front end of the housing 4 is surrounded by the front portion of the housing 4 at a distance (e.g. see FIG. 2). The clamping part 5 is configured to receive and position the cable plug 2 in a predetermined position at a front portion of the clamping part 5, wherein a tapered rear portion of the clamping part 5 is configured to engage around the cable 3 when the cable plug 2 is received and positioned by the clamping part 5 in the predetermined position. Similarly to the embodiment of the prior art depicted by FIG. 1, the radially compressible tapered section is embodied by fingerlike spaced-apart extensions 8, which comprise tangentially running rips 9 on their inside (e.g. see FIGS. 5 and 13).

Figure 4:
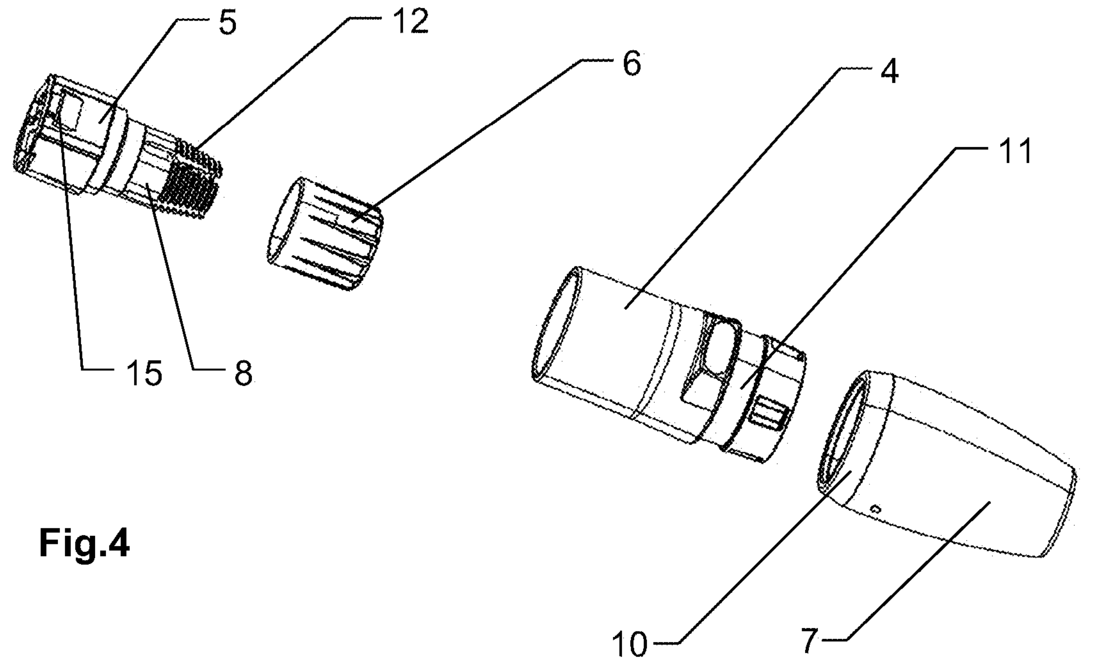
FIG. 4: an exploded view of the plug assembly depicted by FIG. 2 in a perspective from the side onto the bottom side of the plug assembly.
Figure 5:
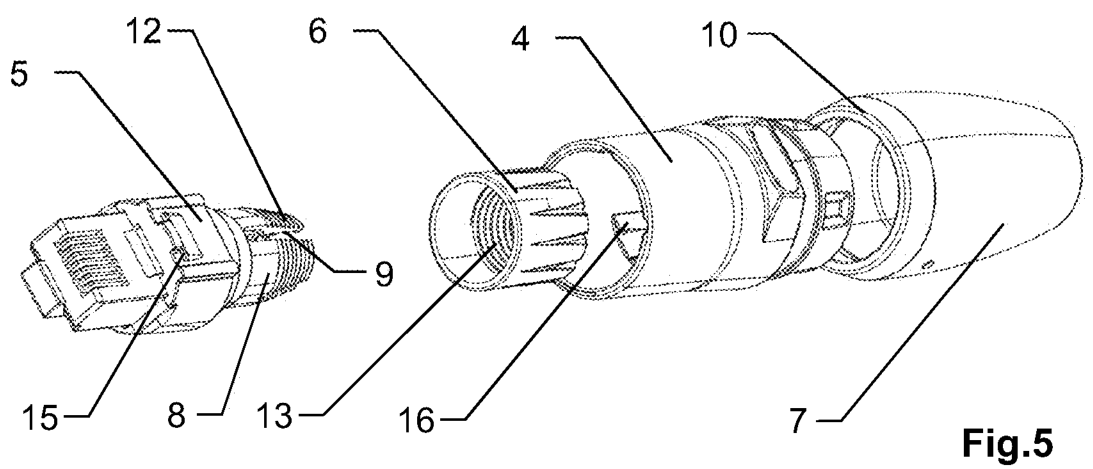
FIG. 5: a further exploded view of the plug assembly depicted by FIG. 2 in a perspective from the front onto the bottom side of the plug assembly.

In the embodiment shown, the clamping sleeve 6 and the kink protector 7 are separate components, wherein a front portion of the kink protector comprises an elastic coupling portion 10 configured to engage a rear portion 11 of the housing in a form-fitting manner (e.g. see FIGS. 4 and 5).

By way of example, the tapered section of the clamping part 5 comprises an external thread 12 that extends over a tapered external thread area, wherein the clamping sleeve 6 has an internal thread 13 that extends over a tapered inner contacting section, thereby forming a tapered internal thread area (e.g. see FIGS. 4 and 5). The internal thread area has a tapered shape that matches a tapered shape of the external thread area and the external thread and the internal thread are configured to engage with each other to provide a threaded connection between the clamping part 5 and the clamping sleeve 6.

Figure 6:
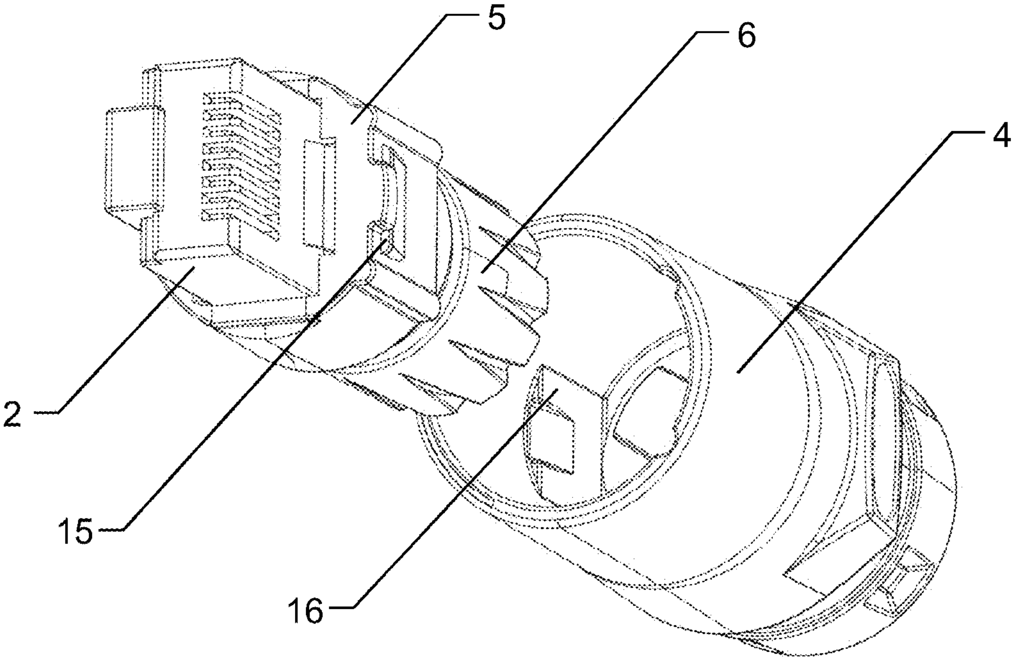
FIG. 6: a perspective view onto the bottom side of the clamping part and the housing of the plug assembly depicted by FIG. 2 before the clamping part is inserted into the housing.
Figure 7:
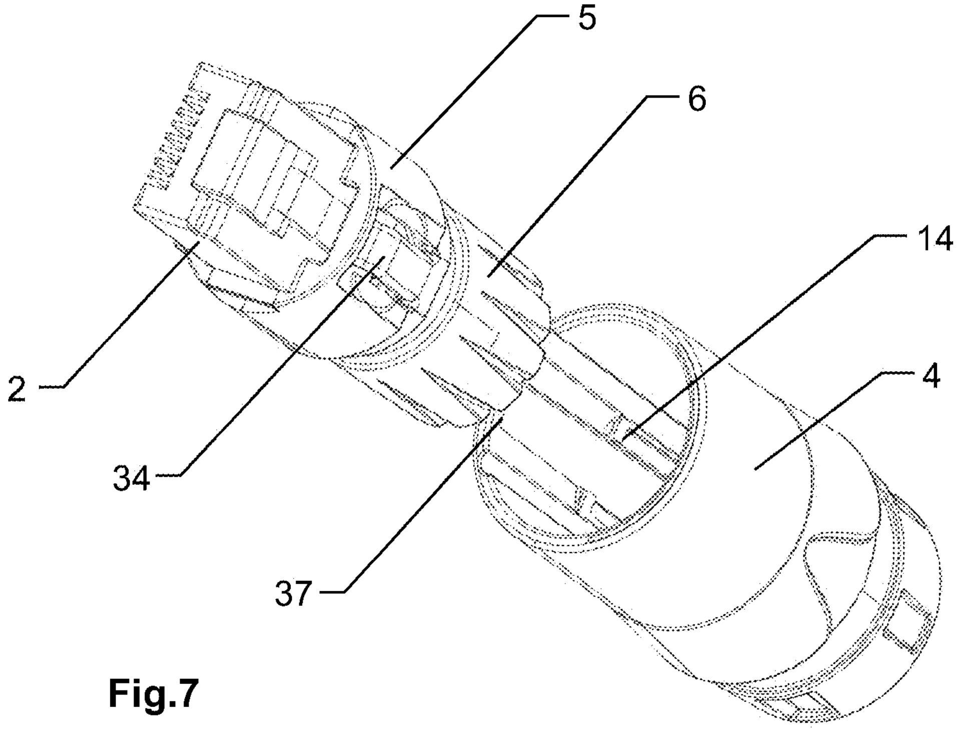
FIG. 7: a perspective view onto the top side of the clamping part and the housing of the plug assembly depicted by FIG. 2 before the clamping part is inserted into the housing a further explosion view of the plug assembly depicted by FIG. 2.
Figure 19:
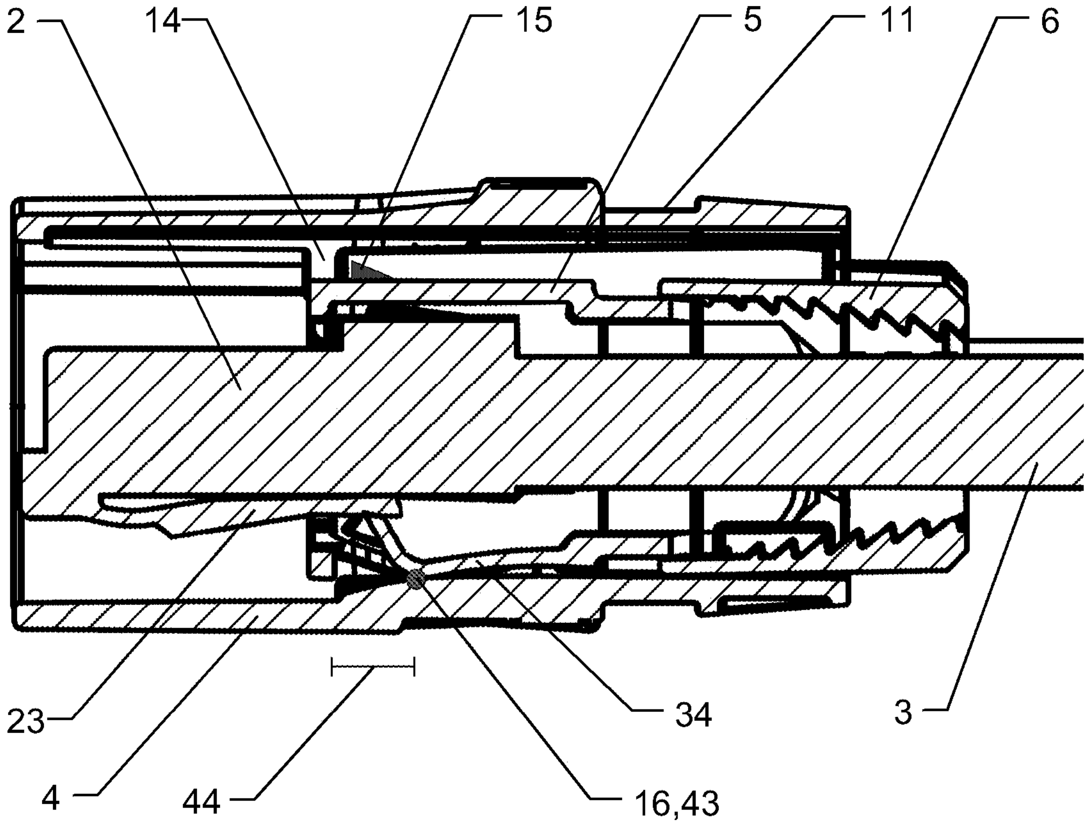
FIG. 19: a longitudinal section through the plug assembly depicted by FIG. 2 but without kink protector.

The plug assembly 1 is configured to provide a latched position of the clamping part 5 in the housing 4 by a stop element 14 arranged on the inside of the housing and an engagement element 15, arranged on the outside of the clamping part 5 (e.g. see FIGS. 6, 7, 19). For example, the stop element 14 is embodied as a transverse step running in tangential direction on the inside of the housing 4 configured to prevent movement of the clamping part 5 toward the front end of the housing (e.g. see FIG. 7). The engagement element 15 may be embodied as a transverse ridge on the outside of the clamping part 5 configured in a complementary manner to the step (e.g. see FIG. 6).

The housing 4 comprises on its inner side opposite the stop element 14 a clamping part support area 16, wherein, in the latched position of the clamping part 5 in the housing 4, the clamping part support area 16 is arranged further toward the rear end of the housing 4 than the stop element 14 and rests against the clamping part 5. This arrangement allows a release of the latching connection between the clamping part 5 and the housing 4 by means of a tilting movement about a tilting axis 43 transverse to a longitudinal axis of the housing 4 (e.g. see FIG. 19).

Figure 18:
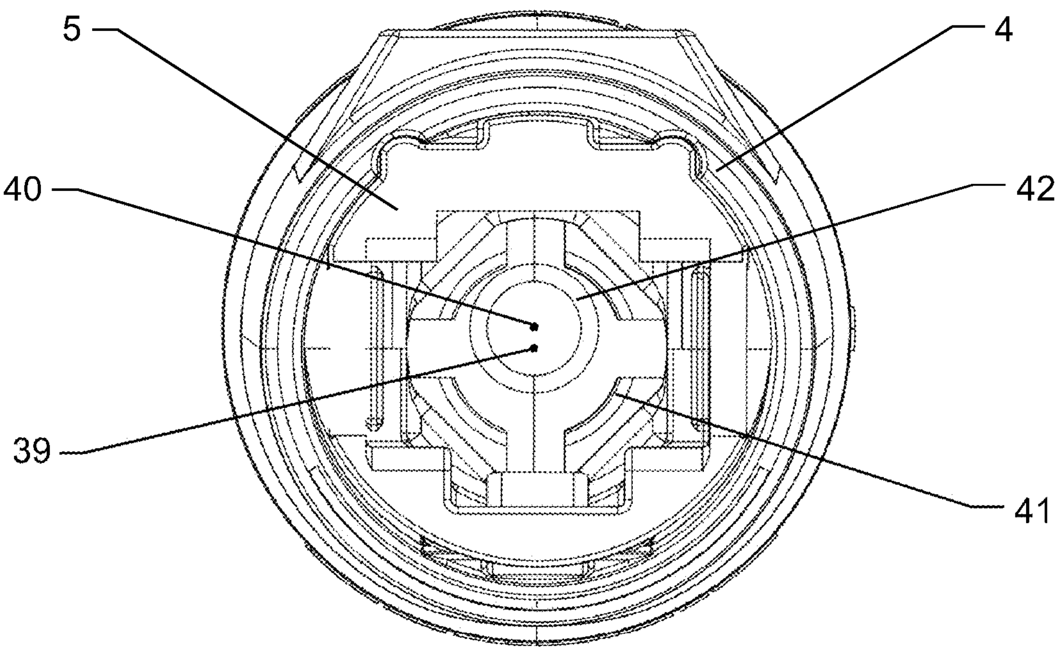
FIG. 18: a view directly from the front into the plug assembly depicted by FIG. 2 but without cable plug.

In the embodiment shown, freedom of movement for the tilting movement of the clamping part about the tilting axis 43 is provided in that the housing 4 has a cylinder-like front section, which is offset parallel to a cylinder-like rear section of the housing. This can be seen by FIG. 18, showing a frontal view onto the insertion opening of the plug assembly without cable plug 2. The black dots indicate the central longitudinal axes 39, 40 (cylinder axes) of the cylinder-like front section and the cylinder-like rear section. In the view shown, the central longitudinal axis 39 of the cylinder-like front section is below the central longitudinal axis 40 of the cylinder-like rear section. It can also be seen that the clamping part 5 is centrally arranged within the cylinder-like front section of the housing, which, for example, can be seen by the round exit provided by the rear portion 41 of the clamping part, which is symmetrically arranged around the central longitudinal axis 39 of the cylinder-like front section. The kink protector, on the other hand, is attached coaxially to the cylinder-like rear section and thus the round rear exit provided by the rear end 42 of the kink protector is symmetrically arranged around the central longitudinal axis 40 of the cylinder-like rear section of the housing.

Here (e.g. see FIG. 19), for example, the cylinder-like rear section has a maximum radial diameter smaller than a maximum radial diameter of the cylinder-like front section, wherein on the side of the stop element 14, the section of the housing 4 from the clamping part support area 16/the tilting axis 43 to the rear end of the housing 4 transitions essentially steplessly into the section from the stop element 14 to the front end of the housing 4, wherein on the side of the clamping part support area 16, a diameter of the housing 4 increases toward the front end of the housing 4 in a transition area 44 between the section from the clamping part support area 16/the tilting axis 43 to the rear end of the housing 4 and the section from the stop element 14 to the front end of the housing 4.

Figure 3:
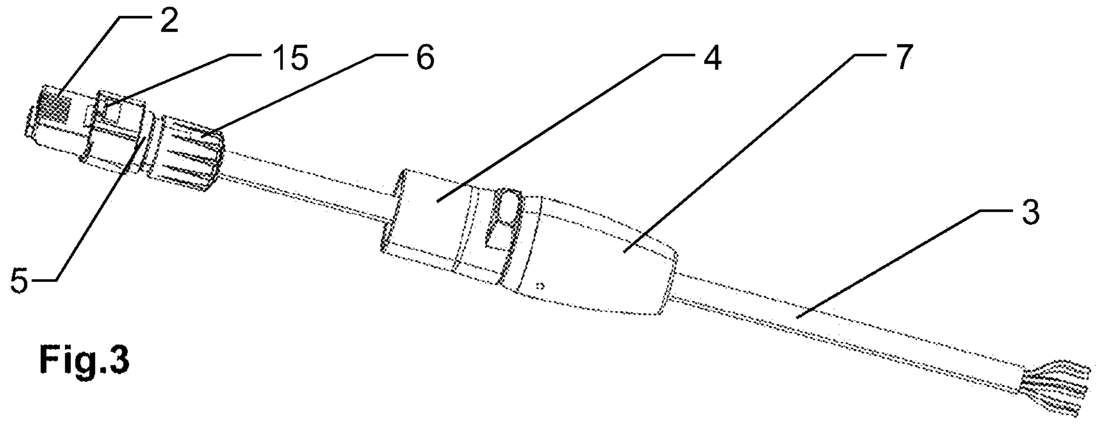
FIG. 3: a further view of the plug assembly depicted by FIG. 2, wherein the housing is pulled from the clamping part to the rear, onto the portion of the cable lying behind the kink protector.

The tilting movement results in the engagement element 15 being brought out of engagement with the stop element 14, such that the housing 4 can be pushed rearward along the cable 3. In other words, the latching arrangement permits the clamping part 5 (together with the cable plug) to be pushed forwards out of the housing 4 (e.g. see FIG. 3) and allows easy access to the preassembled RJ45 cable plug 2. In order to release the latching connection, the front end of the clamping part 5 is pressed downwards away from the stop element 14, as a result of which the clamping part 5 tilts about the transverse tilting axis 43 provided by contact points of the clamping part 5 with the clamping part support area 16, which disengages the engagement element 15 from the stop element 14.

Figure 8:
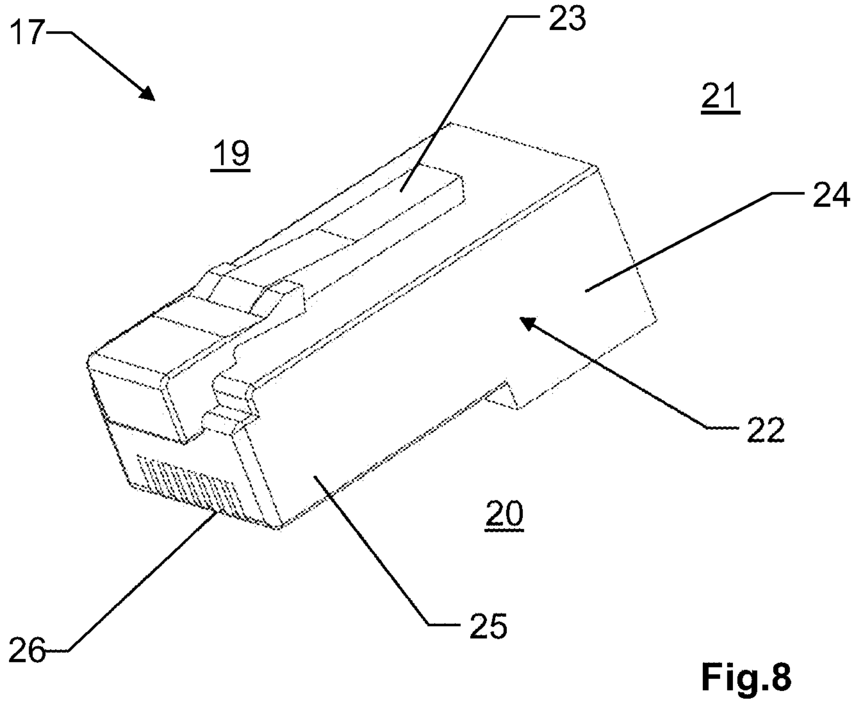
FIG. 8: a perspective view of a RJ45 cable plug of the stepped type.
Figure 9:
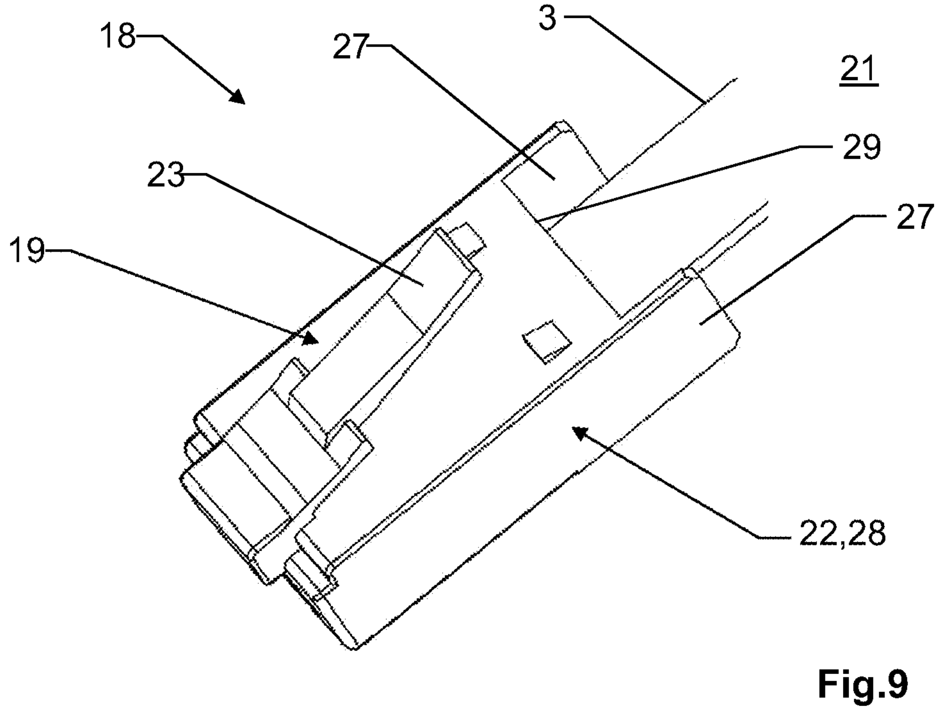
FIG. 9: a perspective view of a RJ45 cable plug of the stepless type.
Figure 10:
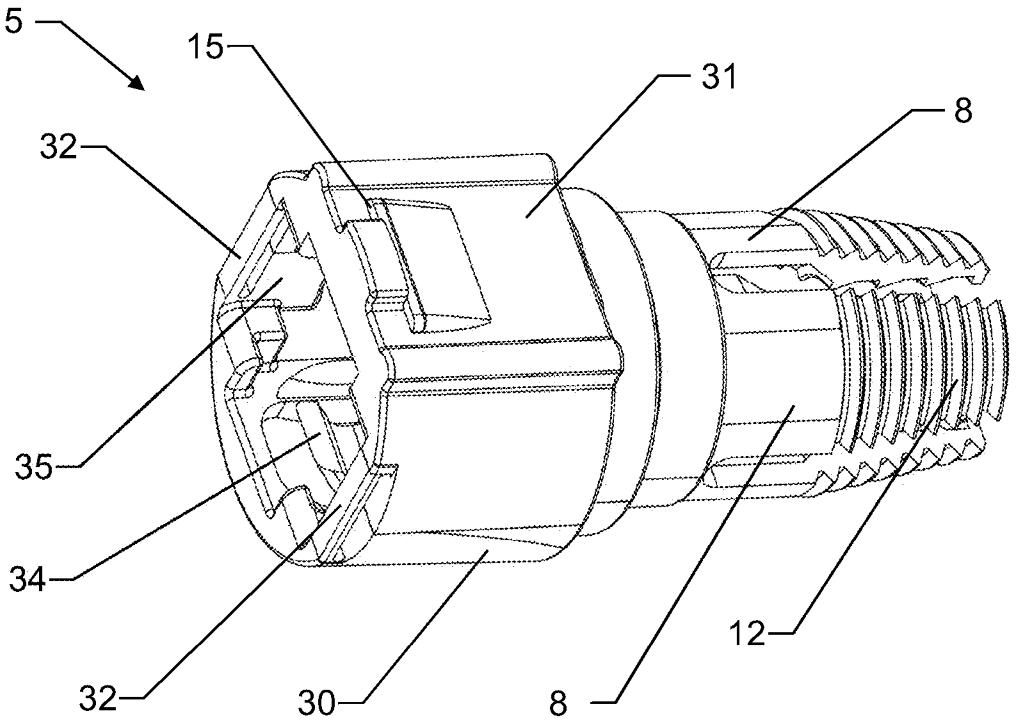
FIG. 10: a perspective view onto the bottom side of a clamping part according to the invention.
Figure 11:
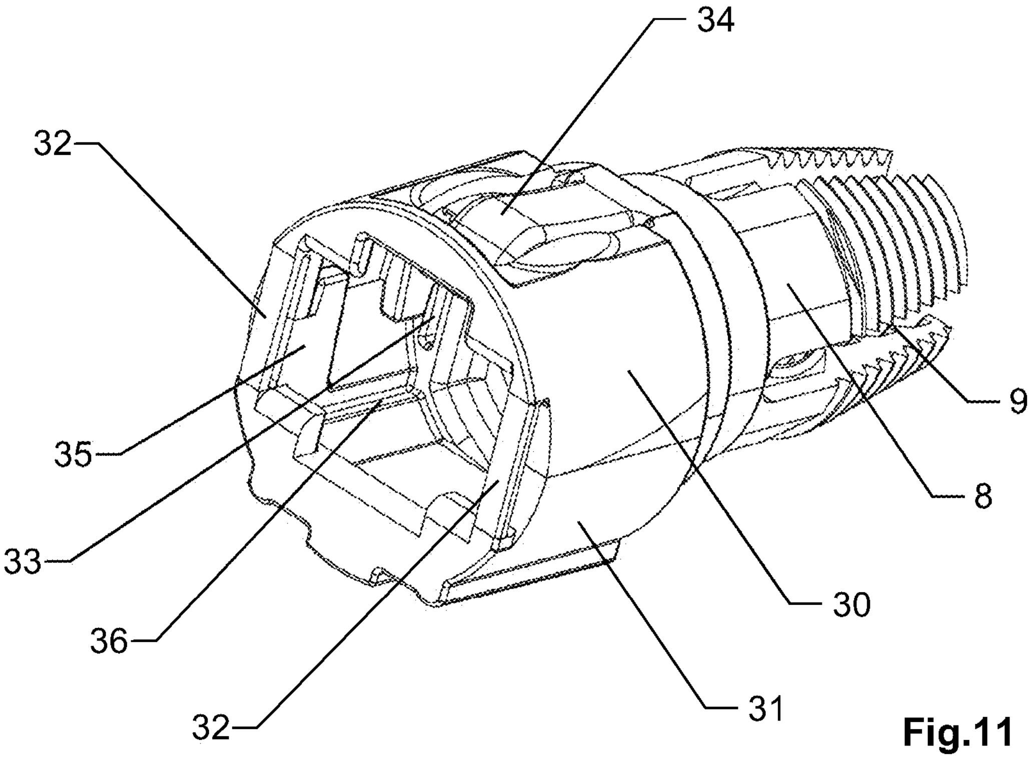
FIG. 11: a perspective view onto the top side of a clamping part according to the invention.
Figure 12:
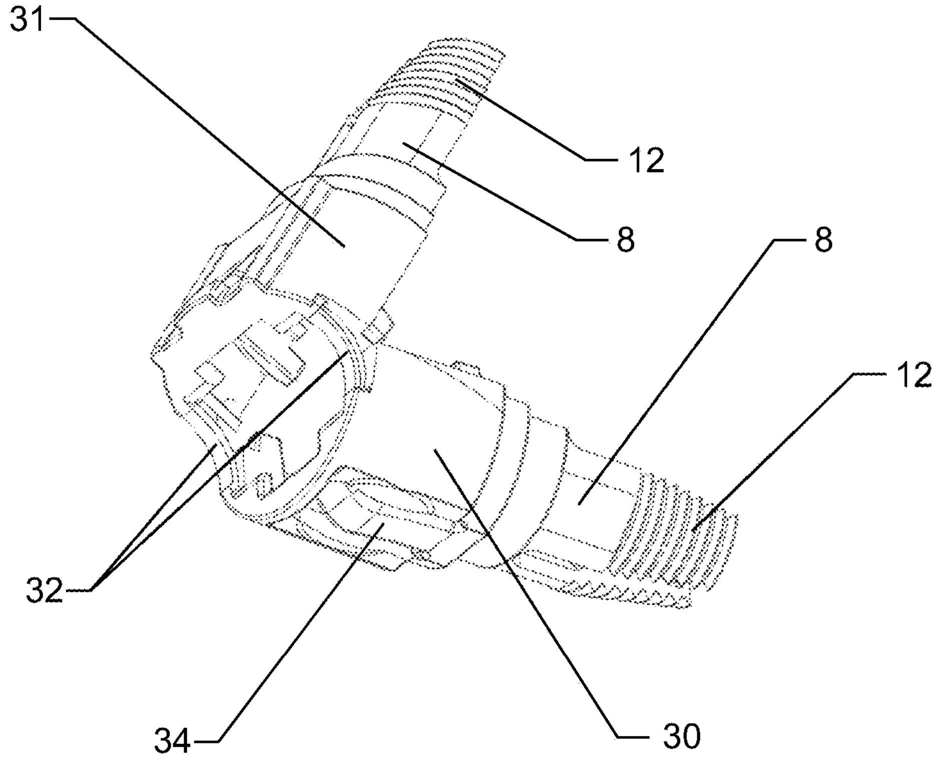
FIG. 12: a perspective view from the front onto a clamping part according to the invention, wherein the two half shells are linked pivotably at the front end clamping part.

The clamping part 5 may be configured to receive and position a RJ45 cable plug of a stepped type 17 (e.g. see FIG. 8) and a RJ45 cable plug of a stepless type 18 (e.g. see FIG. 9). In the following, reference is made to a top side 19, a bottom side 20, a backside 21, and two lateral sides 22 of the RJ45 cable plug. The top side 19 is the side that comprises a latch element 23 of the preassembled RJ45 cable plug 2. The bottom side 20 is opposite the top side 19 and the backside 21 (or rear side) connects the top side 19 with the bottom site 20 on the cable side. Each of the lateral sides 22 is adjacent the backside 21 and connects the top side 19 with the bottom side 20.

The RJ45 cable plug of the stepped type 17 comprises a housing with a stepped surface on the bottom side 20, so that a rear part 24 of the housing has a larger diameter from the bottom side 20 to the top side 19 than a front part 25 of the housing, which has contacts 26 for providing signal transmission.

The RJ45 cable plug of the stepless type 18 comprises a housing that is stepless on the bottom side but has at each of the lateral sides 22 an extension 27, which continues a respective side surface 28 of the housing and extends beyond a housing surface 29 on the backside 21.

The clamping part 5 is embodied by two half-shells 30, 31 which are pivotably linked by a flexible connecting element 32 at the front end (e.g. see FIGS. 10 to 13). One of the two half-shells 30 is configured to receive and position the top side 19 of an RJ45 cable plug and the other of the two half-shells 31 is configured to receive and position the bottom side 20 of an RJ45 cable plug.

The half-shell 30 foreseen to receive the top side 19 of the cable plug comprises two pockets 33, wherein each of the two pockets 33 is shaped to receive one of the two extensions 27 of the RJ45 cable plug of the stepless type 18. This half-shell 30 further comprises a spring element 34 arranged such that it provides a support for the latch element 23 of the RJ45 cable plug (e.g. see FIGS. 10 and 11). Lateral guide surfaces 35 provide a stop for movement of the RJ45 cable plug at a front end of the clamping part 5 in a direction perpendicular to the lateral sides 22 of the RJ45 cable plug. In case of receiving a RJ45 cable plug of the stepped type 17, the RJ45 cable plug is placed in an area in front of the two pockets 33, which provides a boundary for the two lateral sides 22 and the top side 19 of the RJ45 cable plug.

Figure 15:
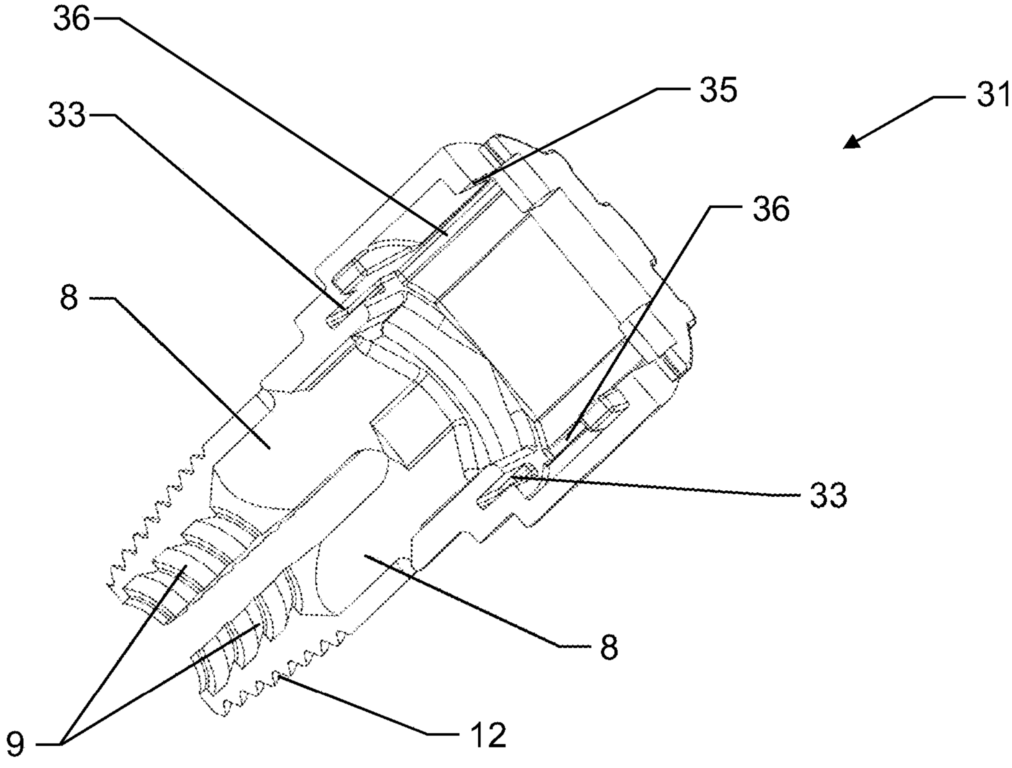
FIG. 15: a top view onto the one of the two half-shells depicted by FIG. 12, which is foreseen for nesting against the bottom side of the RJ45 cable plug; a perspective

Similarly, the half-shell 31 foreseen to receive the bottom side 19 of the cable plug comprises two pockets 33, wherein each of the two pockets 33 is shaped to receive one of the two extensions 27 of the RJ45 cable plug of the stepless type 18. The half-shell 31 also comprises lateral guide surfaces 35 to stop a movement of the RJ45 cable plug at a front end of the clamping part 5 in a direction perpendicular to the lateral sides 22. For receiving a RJ45 cable plug of the stepped type 17, the half-shell 31 comprises a boundary structure in front of two pockets 33, which provides boundaries for the two lateral sides 22 and the bottom side 20 of the RJ45 cable plug. For receiving and accommodating the rear part 24 of the housing of the RJ45 cable plug (which has a larger diameter from the bottom side 20 to the top side 19 than a front part 25 of the housing), the boundary for the bottom side 20 of the RJ45 cable plug of the stepped type 17 is arranged offset from the boundaries for the bottom side of the RJ45 cable plug of the stepless type 18 provided by the two pockets 19 in a direction perpendicular to the bottom side 20 (e.g. see FIGS. 11 and 15). In the example shown, the boundary for the bottom side 20 of the RJ45 cable plug of the stepped type 17 is provided by bearing surfaces 36 on either lateral side 22 for supporting the bottom side 20 of the RJ45 cable plug of the stepped type 17, wherein each of the two bearing surfaces 36 extends parallel to the axial direction from a front end of the clamping part 5 to the level of the front end of the pockets 33.

Figure 16:
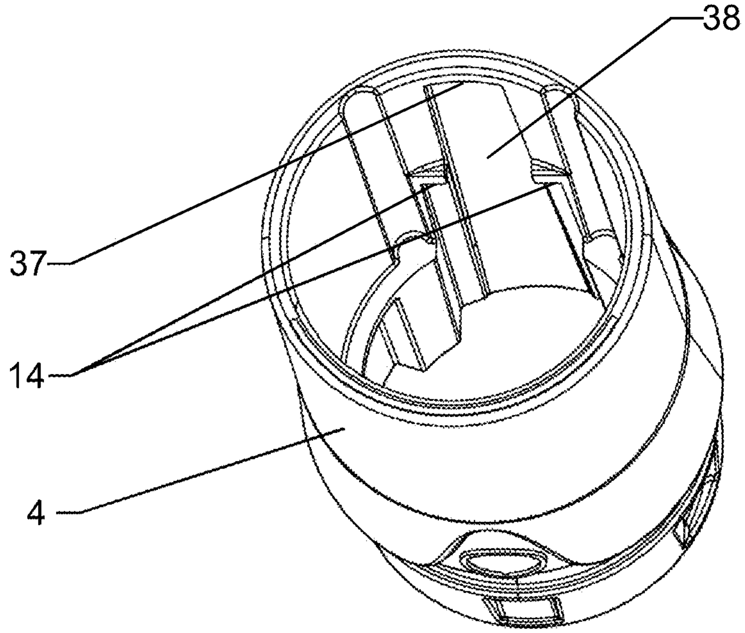
FIG. 16: a perspective view from the front onto a housing according to the invention.
Figure 17:
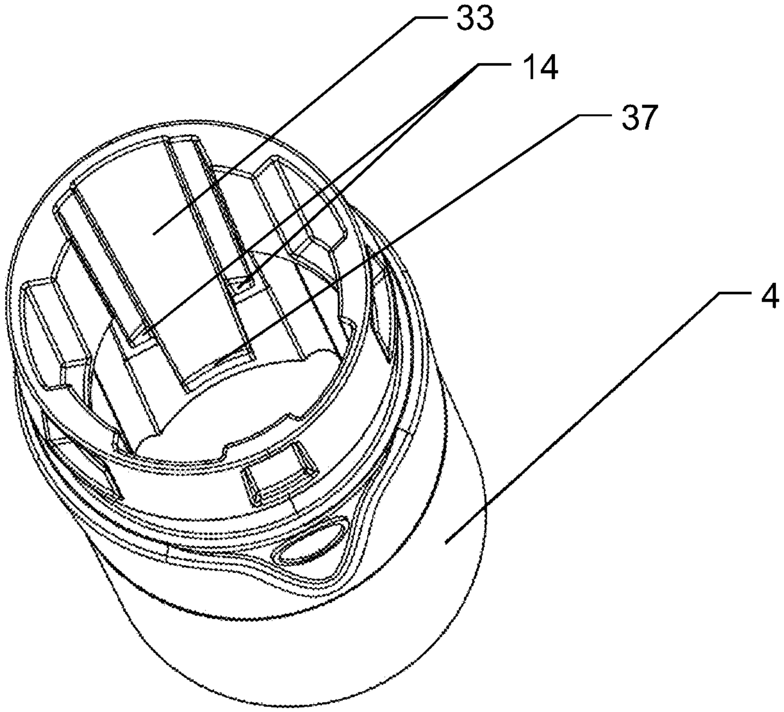
FIG. 17: a perspective view from the rear onto a housing according to the invention.

The housing 4 further comprises on its inside an edge 37 with an edge face facing to a rear end of the housing 4 (e.g. see FIGS. 16 and 17). The edge 37 provides a part of a mechanical locking mechanism for preventing removal of the plug assembly 1 plugged into the socket of the complementary plug assembly from the socket of the complementary plug assembly, in that a releasable counterpart of the complementary plug assembly engages from the inside of the housing 4 into the edge 37 of the housing. The edge face is an end of a groove 38 arranged on the inside of the housing 4, which runs without interruption from the rear end of the housing 4 to the edge face.

Figure 20:
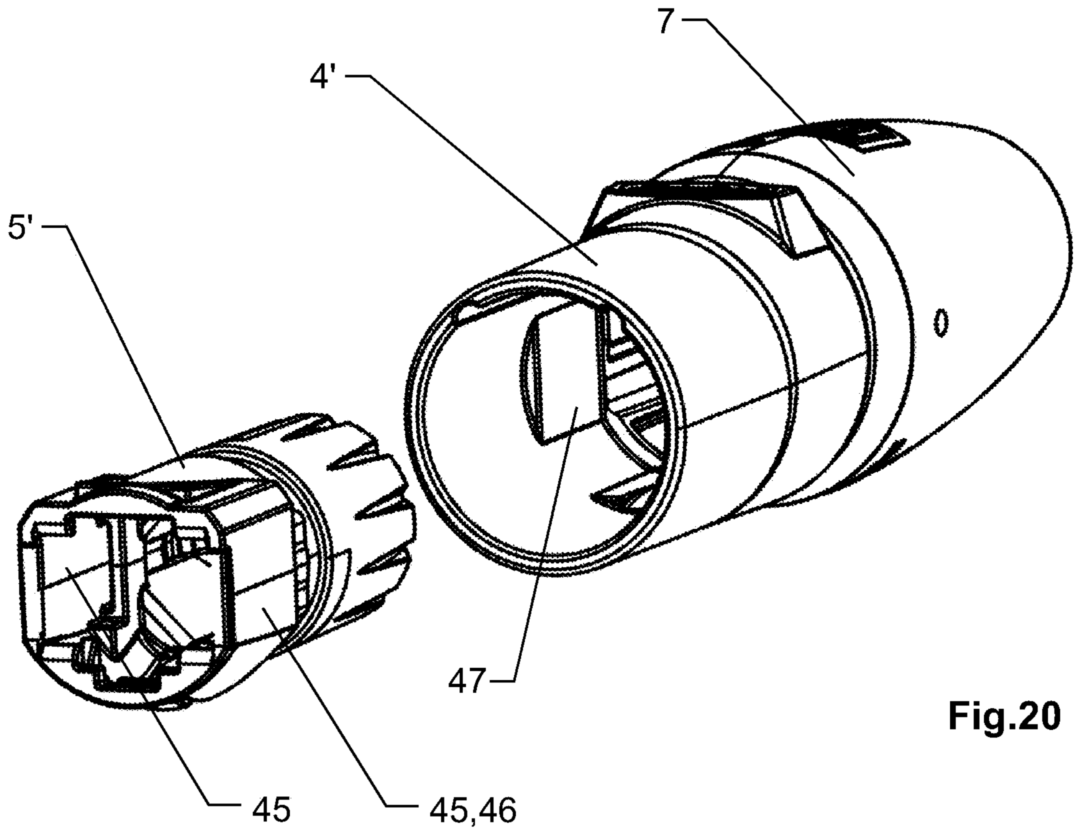
FIG. 20: a perspective view of a clamping part and housing of a further embodiment of a plug assembly according to the invention before the clamping part is inserted into the housing, wherein the clamping part and the housing have matched flat surfaces to prevent the clamping part from twisting about the longitudinal axis relative to the housing.

FIG. 20 shows a further embodiment of the inventive plug assembly, wherein the clamping part 5' comprises two lateral sides 45 opposite each other, which are configured to have flat outer surfaces 46 that are matched to flat surfaces 47 inside the housing 4', so that—in the latched position—contact between the flat surfaces 47 of the housing 4' with the flat outer surfaces 46 of the clamping part 5' prevents the clamping part 5' from twisting about the longitudinal axis relative to the housing 4'.

Figure 21:
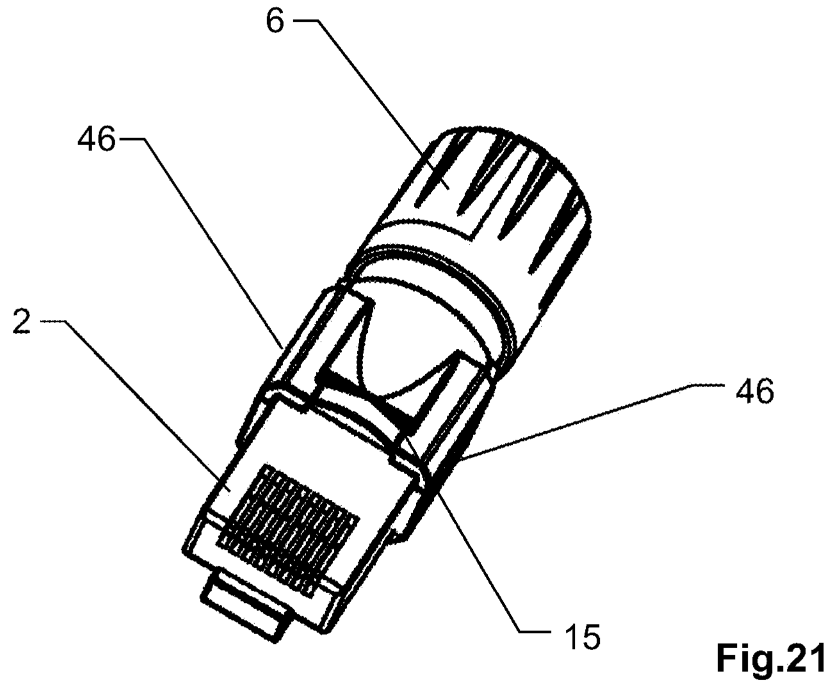
FIG. 21: a top view onto the bottom side of the clamping part depicted by FIG. 20.

FIG. 21 shows a top view onto the bottom side of the clamping part 5' depicted by FIG. 20. Having flat lateral surfaces 46 provides for a compact enclosure of the cable plug 2, which has benefits when multiple cable plugs received by inventive plug assemblies have to be connected next to each other in a "conventional way" with the respective clamping parts being pushed away from their housings (using sockets not shaped in a complementary way with respect to the housing).

In the embodiment shown, the clamping part 5' is configured to receive a RJ45 cable plug and the clamping part 5' is dimensioned such that in a separated state, wherein the clamping plug 5' is separated from the housing 4', it can be tightly plugged next to other RJ45 plugs received by respective clamping parts, e.g. in case several RJ45 plugs have to be connected into a "conventional" switch component that has multiple "conventional" RJ45 sockets (not shaped in a complementary way with respect to the housing).

Although the invention is illustrated above, partly with reference to some preferred embodiments, it must be understood that numerous modifications and combinations of different features of the embodiments can be made. All of these modifications lie within the scope of the appended claims.

The invention claimed is:

1. A plug assembly for use with a cable having a cable plug, the plug assembly comprising:

a clamping part configured to receive and position the cable plug in a predetermined position at a front portion of the clamping part, a rear portion of the clamping part opposite the front portion of the clamping part configured to engage around the cable when the cable plug is received and positioned by the clamping part in the predetermined position;

a housing that is adapted to be plugged into a socket of a complementary plug assembly by approaching the socket with a front end of the housing, wherein the housing is configured to receive and position the clamping part in a latched position;

a latching arrangement that provides the latched position by a stop element, arranged on an inside of the housing, and an engagement element, arranged on an outside of the clamping part, and in the latched position of the clamping part in the housing, the engagement element is arranged opposite the stop element and engages the stop element such that movement of the clamping part along a longitudinal axis of the housing toward the front end of the housing causes the engagement element to abut against the stop element, thereby preventing further movement of the clamping part toward the front end of the housing;

the housing comprises on an inner side thereof opposite the stop element a clamping part support area and is configured such that the engagement element is bringable out of engagement with the stop element by a tilting movement of the clamping part about a tilting axis through contact points of the clamping part with the clamping part support area, with the tilting axis being arranged transverse to the longitudinal axis and the tilting movement causes the engagement element to disengage from the stop element.

2. The plug assembly according to claim 1, wherein the housing and the clamping part are matched to one another and, in the latched position of the clamping part in the housing when the cable plug is received and positioned in the predetermined position at the front portion of the clamping part, the clamping part support area rests against the clamping part and is arranged further toward a rear end of the housing than the stop element, and in a front portion of the housing from the clamping part support area toward the front end of the housing there is freedom of movement of the clamping part against the housing on a side of the clamping part support area, and in a rear portion of the housing from the clamping part support area toward the rear end of the housing there is freedom of movement of the clamping part against the housing on side of the stop element.

3. The plug assembly according to claim 1, wherein the engagement element is arranged at the front portion of the clamping part.

4. The plug assembly according to claim 1, wherein the contact points of the clamping part lying on the tilting axis in the latched position are arranged at the front portion of the clamping part.

5. The plug assembly according to claim 2, wherein from the clamping part support area to the rear end of the housing an inner contour of the housing is formed with a circular cylinder shape and from the stop element to the front end of the housing an inner contour is formed with a further circular cylinder shape, and central longitudinal axes of the respective cylinder shapes are offset parallel to each other.

6. The plug assembly according to claim 2, wherein a maximum radial diameter of the housing in a section from the clamping part support area to the rear end of the housing is smaller than a maximum radial diameter of the housing in a section from the stop element to the front end of the housing.

7. The plug assembly according to claim 1, wherein the latching arrangement further comprises a spring element of the clamping part which is supported in the latched position on a spring element contact area on an inside of the housing opposite the stop element and configured for exerting a biasing force against the spring element contact area, thereby pushing the clamping part against a side of the housing on which the stop element is arranged.

8. The plug assembly according to claim 7, wherein in the latched position the spring element contact area coincides with at least part of the clamping part support area such that the tilting axis runs through contact points of the spring element with the spring element contact area.

9. The plug assembly according to claim 1, wherein the clamping part has a bottom side, a top side, and two lateral sides, the bottom side comprises the engagement element, the top side is opposite the bottom side, the two lateral sides are opposite each other, and each of the two lateral sides connects the top side with the bottom side, and in an area of the front portion of the clamping part each of the lateral sides has a flat outer surface and the outer surfaces of the two lateral sides are parallel to one another, and the housing comprises on an inner side thereof two flat surfaces arranged opposite each other, and in the latched position, each of the two flat surfaces of the housing is arranged opposite a respective one of the two flat outer surfaces of the clamping part, such that contact between the flat surfaces of the housing with the flat outer surfaces of the clamping part prevents the clamping part from twisting about the longitudinal axis relative to the housing.

10. A plug assembly for use with a cable with a cable plug, the plug assembly comprising:

a clamping part configured to receive and position the cable plug in a predetermined position at a front portion of the clamping part, a rear portion of the clamping part, which is opposite the front portion of the clamping part, configured to engage around the cable when the cable plug is received and positioned by the clamping part in the predetermined position, the rear portion having a radially compressible tapered section having an outer shape that tapers towards a rear distal end of the clamping part, a clamping sleeve configured to approach the clamping part with a front end of the clamping sleeve and to be connected to the rear portion of the clamping part by a threaded connection, such that tightening of the threaded connection results in an inner contacting section of the clamping sleeve being advanced over the tapered section of the clamping part towards the front portion of the clamping part while being in contact with the tapered section, resulting in increasing radial compression of the rear portion of the clamping part;

a housing for being plugged into a socket of a complementary plug assembly by approaching the socket with a front end of the housing, the housing being configured to receive and position the clamping part in a front portion of the housing such that, when the cable plug is received and positioned in the clamping part and the clamping part is received and positioned in the housing, at least a front portion of the cable plug extending in a direction of the front end of the housing is surrounded by the front portion of the housing at a distance;

the tapered section of the clamping part comprises a tapered external thread area with an external thread that extends over the tapered external thread area; and the inner contacting section of the clamping sleeve comprises a tapered internal thread area with an internal thread that extends over the tapered internal thread area;

wherein the internal thread area has a tapered shape that matches a tapered shape of the external thread area and the external thread and the internal thread are configured to engage with each other to provide the threaded connection; and wherein the clamping part is divided in a longitudinal direction into two half shells which are linked pivotably at the front end and at the rear end have the external thread for engaging with the internal thread of the clamping sleeve.

11. The plug assembly according to claim 10, wherein the rear portion of the clamping part comprises two radially compressible, spaced-apart extensions, and an outer shape of the extensions forms at least part of the radially compressible tapered section of the clamping part.

12. The plug assembly according to claim 10, wherein each of the external and the internal thread comprises maximally ten turns.

13. A clamping part for a plug assembly, the clamping part comprising:

two half-shells that are divided from one another in a longitudinal direction, the two half-shells are configured to clamp a RJ45 cable plug between them and thereby position the RJ45 cable plug in a predetermined position at a front portion of the clamping part;

a radially compressible rear portion, which is opposite the front portion, is configured to engage around a cable connected to the RJ45 cable plug when the RJ45 cable plug is positioned by the two half shells in the predetermined position;

one of the two half-shells is configured for nesting against a top side, a backside, and two lateral sides of the RJ45 cable plug, and the other of the two half-shells is configured for nesting against a bottom side, the backside, and the two lateral sites of the RJ45 cable plug, the top side comprises a latch element configured to latch the RJ45 cable plug to a conventional RJ45 socket, the bottom side is opposite the top side, the backside connects the top side with the bottom site on the cable side, and each of the lateral sides is adjacent the backside and connects the top side with the bottom side, such that the clamping part is configured to individually clamp and position either one of a) a RJ45 cable plug of a stepped type, which comprises a housing with a stepped surface on the bottom side, so that a rear part of the housing adjacent to the cable has a larger diameter in a direction perpendicular to the bottom side than a front part of the housing, which has contacts for providing signal transmission to the complementary plug assembly, or b) a RJ45 cable plug of a stepless type, which comprises a housing that is stepless on the bottom side, wherein the housing has at each of the lateral sides an extension, which continues a respective side surface of the housing and extends beyond a housing surface on the backside;

the two half-shells each comprise an alignment structure to position the RJ45 cable plug in the predetermined position, wherein each said alignment structure comprises two pockets arranged in a rear area of the respective alignment structure, wherein each of the two pockets is configured to receive one extension of the RJ45 cable plug of the stepless type such that each of the two pockets of one of the two half-shells provides a boundary for the top side and the two lateral sides of the RJ45 cable plug of the stepless type and each of the two pockets of the other of the two half-shells provides a boundary for the bottom side and the two lateral sides of the RJ45 cable plug of the stepless type, and a boundary structure arranged in an area in front of the two pockets, wherein one of the boundary structures provides a boundary for the two lateral sides and the top side of the RJ45 cable plug of the stepped type and the other of the boundary structures provides a boundary for the two lateral sides and the bottom side of the RJ45 cable plug of the stepped type, respectively, and the boundary for the bottom side of the RJ45 cable plug of the stepped type is arranged offset from the boundaries for the bottom side of the RJ45 cable plug of the stepless type provided by the two pockets in a direction perpendicular to the bottom side;

wherein the alignment structures to position the RJ45 cable plug in the predetermined position are configured such that each of the two half-shells front ends of each of the two pockets provide a boundary for the backside of the RJ45 cable plug of the stepped type.

14. The clamping part according to claim 13, wherein the alignment structure for the one of the two half-shells that is configured for nesting against the top side of the RJ45 cable plug comprises a spring element arranged such that the spring element provides a support for a latch element of the RJ45 cable plug to position the RJ45 cable plug in the predetermined position.

15. The clamping part according to claim 13, wherein each of the pockets of the alignment structure has an axial depth such that the pocket provides a backside boundary of the RJ45 cable plug of the stepless type such that the extensions of the RJ45 cable plug of the stepless type are brought into contact with the backside boundaries to position the RJ45 cable plug of the stepless type in the predetermined position.

16. The clamping part according to claim 13, wherein the alignment structures are configured such that the boundary for the bottom side of the RJ45 cable plug of the stepped type is brought into contact with the bottom side of the RJ45 cable plug of the stepped type to position the RJ45 cable plug of the stepped type in the predetermined position.

17. The clamping part according to claim 13, wherein the alignment structures are configured such that the boundaries provided by the pockets for the bottom side of the RJ45 cable plug of the stepless type are brought into contact with the bottom sides of the extensions of the RJ45 cable plug of the stepless type to position the RJ45 cable plug of the stepless type in the predetermined position.

18. The clamping part according claim 14, wherein the alignment structures are configured such that to position the RJ45 cable plug in the predetermined position, the spring element provides a biasing force against the latch element of the RJ45 cable plug, resulting in the boundary for the bottom side of the RJ45 cable plug of the stepped type being brought into contact with the bottom side of the RJ45 cable plug of the stepped type, and the boundaries provided by the pockets for the bottom side of the RJ45 cable plug of the stepless type being brought into contact with the bottom sides of the extensions of the RJ45 cable plug of the stepless type, respectively.

* * * * *